United States Patent Office 3,334,052
Patented Aug. 1, 1967

3,334,052
METHOD OF PREPARING A GEL PRODUCT CONTAINING AIR BUBBLES AND THE USE THEREOF
Fredrik Wilhelm Anton Kurz, Nysatravagen 12, Lidingo, Sweden, and Sverre Wikne, Salhus, Bergen, Norway
No Drawing. Filed Apr. 30, 1963, Ser. No. 294,785
4 Claims. (Cl. 252—316)

The present invention relates to a method of making a gel product which contains air bubbles.

It is known to convert high viscosity water-soluble substances such as alginates, carboxymethylcellulose (CMC), guar gum, starch, viscose and similar products, into water-insoluble products by introducing an aqueous solution of such substances into a coagulating bath wherein the ions which form soluble salts are replaced by ions which form insoluble salts. The gel product formed in this manner can contain up to 99% water which is not separated from the gel even under a high pressure. These gel products may be in the form of large continuous more or less thick elements, but may also prior to, during or after coagulation be comminuted to form small particles, e.g. small substantially spherical beads if the gel-forming solution is centrifuged, dropped or sprayed into a coagulating bath or is comminuted in any other way. These small particles are so strong that when admixed to hydraulic cement compositions, such as Portland cement or gypsum, or to ceramic substances, plastics, fiberboard etc., they are not disintegrated, even if they are subjected to a relatively strong pressure, such as in a concrete mixer, extruder or autoclave. The advantage of adding such gel particles is that they form pores in the material whereto they are added in that the water contained in the gel particles slowly evaporates and forms minute cells in the surrounding material which therefore is of low density and well insulating.

It was found, however, that these gel products sometimes still have the disadvantage that drying of the gel water takes too long, e.g. in cold weather (when concrete is cast in the winter etc.) or when building boards of gypsum are manufactured in continuous production, in which case a rapid drying is necessary to achieve a high rate of production. Additional application of heat to dry the product would make the production more expensive. It has therefore already been suggested to incorporate air or gas in the gel product or gel particles. Hitherto, however, it has not been possible to realize this suggestion in a practical manner. It is possible to produce air bubbles in the gel-forming solution prior to hardening if the solution is whipped or compressed air is introduced, but the air bubbles produced in this manner are both too large and too unevenly distributed and also tend to disappear before hardening has taken place with the result that it is not possible to achieve more than about 20% air bubbles in the gel product, which is easily collapsed under pressure because the size and distribution of the air bubbles is unsuitable. Particles produced in this manner are not useful for admixture to a building or insulating material.

The object of the present invention is to provide resistant gel products or small gel particles (beads) which contain up to 80% or more air or gas bubbles, said gel products having the advantage, besides a more easy and rapid evaporation, of being considerably cheaper in manufacture than gel products or gel particles without air since a smaller amount of gel-forming material (alginate, CMC, guar gum etc.) is required.

The invention consists in adding to the gel-forming solution a small amount of foaming agent or gas-evolving agent, e.g. 0.1% by weight of said solution, whereupon it is foamed or the evolution of gas takes place, so as to form a strong foam (air bubbles) uniformly distributed throughout the solution. A condition is that the foam is sufficiently stable and sufficiently durable, so that the uniformly dispersed foam bubbles are maintained while the solution is transferred to the coagulating bath or while it is comminuted or atomized to form small particles during centrifugation, spraying or the like.

In this manner, very small air or gas bubbles can be formed and incorporated in the gel product. These bubbles have a size of from 0.5 down to 0.001 mm., mainly between 0.1 and 0.01 mm. Under these conditions, the air-containing gel material, in particular gel beads or particles, is so strong that in spite of the high proportion of between 20 and 90% air bubbles it withstands a relatively high pressure and can be admixed to other substances which are to be rendered porous by evaporation of the occluded gel water which is set through with air bubbles. They can be subjected to an intense mechanical agitation, extrusion, autoclave treatment, etc. Such small gel particles of spherical shape and filled with air bubbles also have the advantage of facilitating the admixture to the substance which is to be rendered porous, since they act so to speak as ball bearings, thereby improving the structure and contributing to homogenization of the material to be rendered porous.

Another advantage of the process of this invention is that the amount of air or gas bubbles can be exactly predetermined by controlling the foaming or evolution of gas until the desired volume is achieved.

Such air-filled small gel particles, in particular of substantially spherical or spheroidal shape have a number of important uses, such as a pore-forming additive, either alone or in conjunction with foaming or gas-evolving additives, in hydraulic cement compositions, such as concrete, gypsum, gas accumulator compounds, but also in asbestos cement, building board or tiles of wood, glass or mineral fibers, plastic compounds and ceramic compounds of clay, fireclay and the like and also in co-called tamping compounds (ramming mixtures). For ceramic products and tamping compounds, the lower water content is of particular importance, since the high water content of gel particles devoid of air bubbles makes drying and firing difficult, in particular in the case of refractory products and tamping compounds. Hitherto, it has not been possible at all to make lightweight tamping compounds, which is rendered possible by means of the new air-filled gel particles, whereby the bulk density of the tamping compound can be reduced from above 2 to 1.5 or even 1 depending on the compression strength desired. This is true of all the three types of tamping compounds: (a) the ceramically bonded compounds which are formed by sintering, i.e. formation of a vitreous phase, (b) the hydraulic bonded which contain aluminate cement, (c) the chemically bonded which are set by a reaction between the raw materials used, e.g. phosphate bonding, aluminum bonding, magnesium bonding.

Together with the air-filled gel beads or particles, it is possible to add to the materials to be rendered porous other substances which serve to make the porous materials more resistant to various influences, such as pressure, moisture, heat etc.

Small air-filled gel particles can also be coated or impregnated with Portland cement, gypsum, plastics, ceramic compounds etc. which after drying and, in the case of clay products, firing give small hollow beads of concrete, gypsum, fired clay etc, which can be used as a loose insulating material.

The gel-forming substances to be used in the process of this invention are the same as in the prior processes referred to above, such as alginates, carboxymethylcellulose, and other cellulose ethers and esters, guar gum, starch, viscose and other water-soluble high molecular weight substances. The hardening or coagulating bath varies, of course, with the gel-forming substance used, and can be, e.g., a solution of calcium hydroxide for a solution of alginate. As explained in U.S. Patent No. 3,233,011, the hardening or coagulating bath varies with the gel-forming substance used, such as alum for carboxymethylcellulose, sulphuric acid for viscose, borax or lead acetate for mannogalactans, optionally combined with other salts, glyoxal for all substances containing hydroxyl or carboxyl groups, such as starches, devtran, pectins, CMC, etc. In some cases it may be advantageous to mix several gel materials, for instance, alginate and guar gum together with some borax (kept below pH 7), or to use several hardening baths in series to achieve a greater resistance. It may also be desirable, by means of certain additives, a small addition of sodium bicarbonate, pepsin, triethanolamine, ammonium chloride or the like, to the solution or hardening bath, to influence the osmotic pressure to cause swelling of the hardened gel particles due to their taking up a small amount of water from the hardening bath.

In the preparation of small air-filled gel particles which are much lighter than water certain precautions must be taken, in particular in the hardening step. While non-air-filled particles need only be slightly agitated in the hadening bath, to cause the bath to contact the particles on all sides and to cause all the occluded solution to be converted into a gel, the air-filled small particles float which renders the hardening more difficult. Therefore, measures must be taken which force the light air-filled particles below the surface of the hardening bath, either by mechanical means or by moving the particles from the hardening bath container into which they drop after centrifugation, spraying etc. into a second container wherein they are immersed in the hardening bath or into a pipe or tubular conduit, wherein they are surrounded by the hardening liquid and are slowly advanced so that they are kept in the hardening time during a sufficient period to complete the hardening (ion exchange).

The size of the air-filled gel particles can be controlled in various ways and is preferably from about 1 to 5 mm. When they are formed by centrifugation, the size can be controlled by varying the speed of rotation, when they are formed by spraying the size of the nozzles can be varied. Also, the size can be controlled by varying the viscosity of the solution, which depends on the concentration thereof (which is in general between 0.5 and 5% by weight based on the solution) but also on the temperature. A higher temperature of the solution results in smaller particles, a lower temperature in larger particles.

Examples of surface active foaming agents which can be added include fatty alcohol sulfates (e.g. sodium lauryl sulfate and sulfation products of fatty alcohols derived from natural fats), alkyl arylsulfonates (such as sodium dodecylbenzene sulfonate), polyglycol ethers (e.g. ethylene oxide adducts of alkylphenols, fatty alcohols and the like) and many others. The type of the foaming agent is immaterial, provided that it is compatible with the solution of the gel-forming substance and yields a sufficiently stable and durable foam. Many foaming agents are described in the technical and patent literature and also commercially available and can be used in the present process, as will be apparent to those skilled in the art. The amount of foaming agent is generally between 0.01 and 0.5% by weight based on the solution of gel-forming substance. The amount of air included in the gel product can be varied by varying the degree of foaming of the solution and will generally be between 20 and 90% by volume.

Instead of or together with a foaming agent, it is possible to use a substance which forms a gas in contact with the solution or the hardening bath, such as, e.g. aluminum powder. The use of a foaming agent is generally preferred, however, as it is easier to control the amount of air in the hardened gel product when using a foaming agent than by using a gas-evolving substance.

The invention is illustrated, but not limited by the following example.

*Example*

To a 1% by weight aqueous solution of sodium alginate, 0.1% by weight of a commercially available fatty alcohol sulfate salt was added. The solution was agitated by means of a mechanical agitator to form a foam and agitation was continued until the volume was about twice the initial volume. It might be also advantageous to carry out the whipping under pressure. The foamed solution was passed to a rotating perforate container which by centrifugation formed the solution into small droplets each having air bubbles therein and which were thrown into a hardening bath consisting of an aqueous solution of calcium hydroxide, wherein the water soluble sodium alginate was converted partly or fully into a water-insoluble calcium alginate. Since the air-filled gel beads thus formed tended to float on the surface of the bath they were removed by suction from the bath through a conduit wherein they were immersed in the hardening liquid. After being immersed in the liquid for a sufficient time to be completely hardened, they were separated from the bath, and dried. The resultant beads contained about 50% of air as small bubbles of a size of approximately 0.01 to 0.1 mm.

The invention is not limited to the embodiments described above but can be varied in many ways within the scope of the claims.

The air- or gas-filled gel particles can also be dried (evaporated) before admixture to the substances, which are to be rendered porous. In dried state transportation of the gel particles is cheaper. By adding water, eventually together with some swelling-aid, e.g. triethanolamine or the like, just before the application, the particles swell and get the original shape again, ready to be used as pore-forming additives.

We claim:
1. In a method of making gel beads by providing an aqueous solution containing about 0.5–5% by weight of macromolecular water-soluble gel-forming substance selected from the group consisting of alginates, cellulose esters and cellulose ethers, guar gum, starch, viscose and mixtures thereof, said substance being capable of being converted into a hardened gel by treatment with a coagulating substance, and a foaming agent, subdividing said solution into particles and introducing said particles into a solution of such coagulating substance, the improvement consisting in including a gas in finely divided form in said solution of said gel-forming substance and foaming agent before it is subdivided so as to form small gas bubbles which are retained in said hardened gel beads, the amount of gas introduced being such that the hardened gel beads contain between 20 and 90% gas bubbles by volume.

2. The method of claim 1 in which the size of said gas bubbles is between 0.001 and 0.5 mm.

3. The method in which the hardened beads produced according to the method of claim 1 are separated from the coagulating bath and dried.

4. The method in which dried beads produced according to the method of claim 3 are restored to their original size and shape by adding water thereto.

References Cited

UNITED STATES PATENTS

| | | | |
|---|---|---|---|
| 2,023,296 | 12/1935 | Trobridge | 252—307 X |
| 2,652,386 | 9/1953 | Wallman | 23—252 X |
| 3,053,670 | 9/1962 | Nordin | 106—122 X |

LEON R. ROSDOL, *Primary Examiner.*

ALBERT T. MEYERS, *Examiner.*

R. D. LOVERING, *Assistant Examiner.*